H. W. WATTS.
COMBINATION NEST AND PERCH.
APPLICATION FILED AUG. 24, 1909.

968,101.

Patented Aug. 23, 1910.

Witnesses

Inventor
Howard W. Watts
By C. A. Snow & Co.
Attorneys

UNITED STATES PATENT OFFICE.

HOWARD W. WATTS, OF BLOOMSBURG, PENNSYLVANIA.

COMBINATION NEST AND PERCH.

968,101. Specification of Letters Patent. Patented Aug. 23, 1910

Application filed August 24, 1909. Serial No. 514,421.

*To all whom it may concern:*

Be it known that I, HOWARD W. WATTS, a citizen of the United States, residing at Bloomsburg, in the county of Columbia and State of Pennsylvania, have invented a new and useful Combination Nest and Perch, of which the following is a specification.

My present invention is a nest for the use of pigeon fanciers and the object of the invention is to provide a nest which may be so disposed that when not occupied by the bird to which it has been allotted it may be used as a perch. This object is attained by the use of the device illustrated in the accompanying drawing, and the invention consists in certain novel features of the same as will be hereinafter described and claimed.

Figure 1:
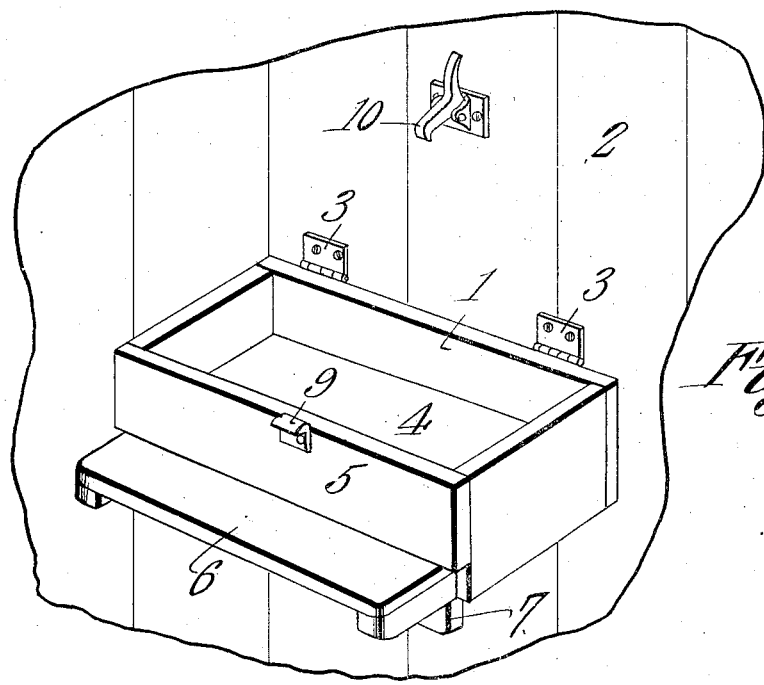
Figure 2:
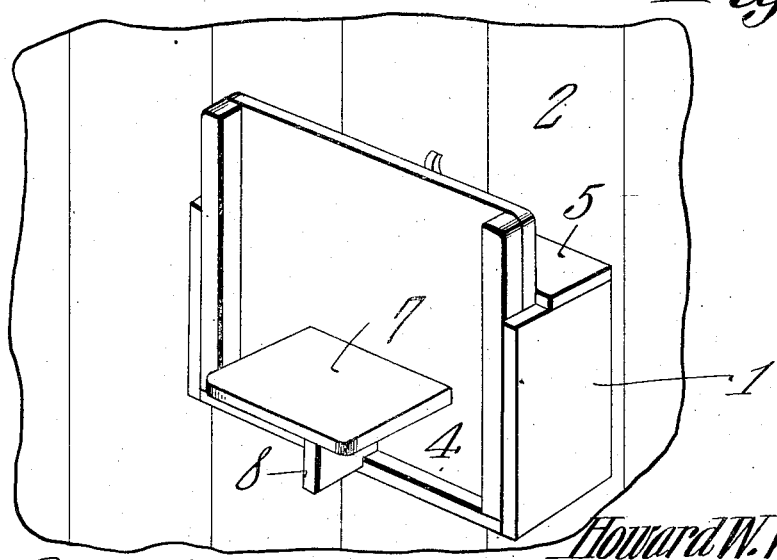

In the drawings, to which reference has just been made, Figure 1 is a perspective view showing the device arranged for use as a nest. Fig. 2 is a perspective view illustrating the device arranged for use as a perch.

The nest is in the form of an open-topped box 1 connected to an upright such as the side 2 of a loft by hinges 3 secured to the loft and to the back side of the nest at the upper edge of the same. The bottom of the nest, 4, is extended forward beyond the closed front side 5 of the same so as to form a step 6 for the use of the birds in entering or leaving the nest, or a perch when the nest is out of use as such; and on the under side of the bottom 4 near the back of the nest I secure a shelf (or perch) 7 which is reinforced and supported by a brace 8 secured to the shelf and the bottom 4 of the nest. On the front side of the nest at the upper edge of the same I provide a lip or lug 9 which forms a keeper adapted to engage a latch 10 pivotally mounted on the side 2 of the loft above the nest so that when the nest is raised it will be held in its raised position by the said latch and keeper.

The use and advantages of the device are thought to be obvious. The box or nest will be of such dimensions as to comfortably contain one pair of birds and as many nests will be provided, of course, as the owner has pairs. Interference with the birds while breeding, or fighting among the birds for a nest will be avoided; and when a bird leaves the nest, the nest may be swung upward upon its hinges so as to be held in its upright position, thereby bringing the top of the nest against the side of the loft so that access to the nest cannot be had, while the bird whose home is in the nest may rest upon the edge of the projected bottom 6 where its droppings will fall either on the closed front 5 of the nest or on the shelf 7 and may be collected later if they are valuable, or the bird may rest on the shelf 7 as a perch if it be of sufficient size. If that is not desired, the shelf may be made smaller.

The device is extremely simple and its use will promote cleanliness in the loft and convenience in handling and breeding the birds.

Having thus described my invention, what I claim is:

A nest comprising an open-topped box hinged to an upright at the upper edge of its rear side, the bottom of the box being extended beyond the closed front side of the same, and a shelf secured to and depending from the under side of the box.

In testimony that I claim the foregoing as my own, I have hereto affixed my signature in the presence of two witnesses.

HOWARD W. WATTS.

Witnesses:
H. SMITH,
R. C. THURSTON.